US007530030B2

(12) United States Patent
Baudisch

(10) Patent No.: US 7,530,030 B2
(45) Date of Patent: May 5, 2009

(54) FACILITATING TARGET ACQUISITION BY EXPANDING TARGETS

(75) Inventor: Patrick Markus Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 10/996,583

(22) Filed: Nov. 24, 2004

(65) Prior Publication Data

US 2006/0112347 A1 May 25, 2006

(51) Int. Cl.
 *G06F 3/00* (2006.01)
 *G06F 3/048* (2006.01)
(52) U.S. Cl. .................. 715/838; 715/788; 715/800; 715/801; 715/815; 715/765; 715/747
(58) Field of Classification Search .......... 715/788, 715/800, 801, 815, 765, 747, 838
 See application file for complete search history.

(56) References Cited

U.S. PATENT DOCUMENTS

| 6,636,244 | B1 * | 10/2003 | Kelley et al. ............ | 715/781 |
|---|---|---|---|---|
| 2003/0081502 | A1 * | 5/2003 | Welke ..................... | 367/97 |
| 2003/0208488 | A1 * | 11/2003 | Perrizo .................... | 707/6 |
| 2005/0047629 | A1 * | 3/2005 | Farrell et al. ............. | 382/117 |
| 2005/0120310 | A1 * | 6/2005 | Sahashi et al. ........... | 715/788 |

OTHER PUBLICATIONS

Michael McGuffin and Ravin Balakrishnan Acquisition of Expanding Targets Paper: Smooth Moves Volumne No. 4 Issue No. 1 20-25 Apr. 2002 pp. 57-64.*

Xavier Munoz, Jordi Freixenet, Xavier Cufi, and Joan Marti Region-Boundary Cooperative Image Segmentation Based onActive Regions CCIA 2002 pp. 364-374.*

Leo Guibas and Jorge Stolfi Primitives for the Manipulation of General Subdivisions and the Computation of Voronoi Diagrams 1983 ACM pp. 221-234.*

Ron Kimmel, Nahum Kiryati, and Alfred Bruckstein Sub-Pixel Distance Maps and Weighted Distance Transforms Journal of Mathmatical Imaging and Vision 6, 223-233 1996.*

Bell, B., et al., "View Management for Virtual and Augmented Reality," *Proceedings of the ACM Symposium on User Interface Software and Technology* 3(2):101-110, Orlando, Fla., Nov. 11-14, 2001.

McGuffin, M., and R. Balakrishnan, "Acquisition of Expanding Targets," *Proceedings of the ACM Conference on Human Factors in Computing Systems* 4(1):57-64, Minneapolis, Minn., Apr. 20-25, 2002.

* cited by examiner

*Primary Examiner*—Doug Hutton
*Assistant Examiner*—Andrea N Long
(74) *Attorney, Agent, or Firm*—Christensen O'Connor; Johnson Kindness PLLC

(57) ABSTRACT

A system and method for facilitating target acquisition is presented. Upon detecting a triggering event to display expanded targets, i.e., icons representing applications, services, folders, and the like, the computer system generates expanded targets and displays them for target acquisition. The expanded targets typically include their source target, and are expanded such that a user may more easily acquire that source target. According to one embodiment, the expanded targets are generated as Voronoi polygons. Alternatively, the expanded targets may be generated as polygons based on a weighted distance based on the area previously assigned to the expanded target.

21 Claims, 8 Drawing Sheets

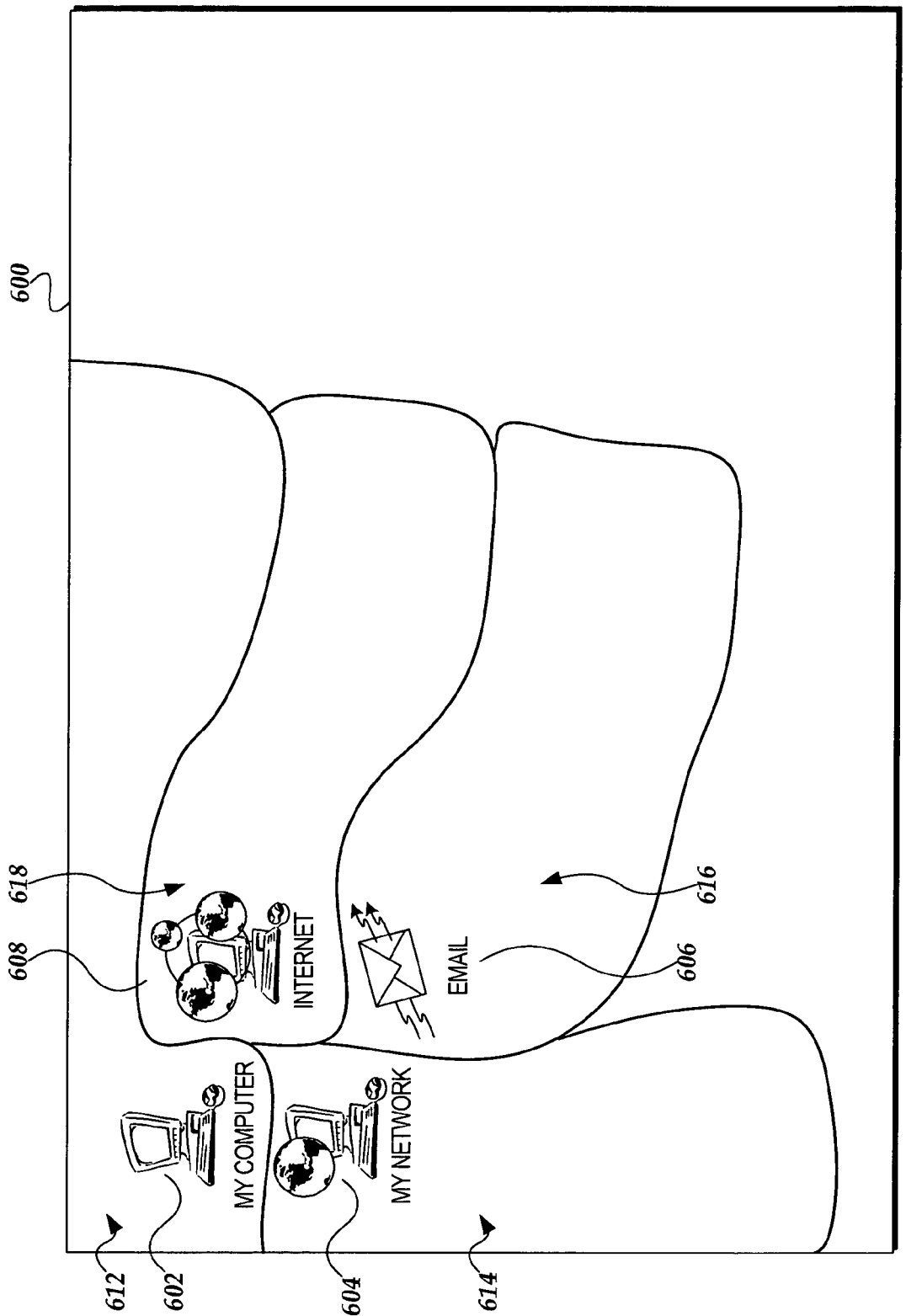

FACILITATING TARGET ACQUISITION BY EXPANDING TARGETS

FIELD OF THE INVENTION

The present invention relates to computer display systems and, more particularly, facilitating target acquisition on a computer display by expanding potential targets in a non-intrusive manner.

BACKGROUND OF THE INVENTION

As computer display systems have increased in resolution, target acquisition has also become increasingly more difficult. Target acquisition refers to accessing an on-screen target, typically an iconic representation of some item displayed on the display device, using a pointer or another object/icon. The pointer may be manipulated directly, such as using a stylus on a pen-based tablet computer, or indirectly, such as using a mouse on a typical desktop computer.

Because modern display systems have very fine resolution, they are able to display substantial information in a relatively small area. The result of the larger display resolution is that a user must be very accurate to acquire/access any particular item on the display system. Unfortunately, target acquisition expands beyond a simple point and click operation to a continual directional correction process, especially over large distances.

At least one solution directed to facilitating target acquisition has been set forth by Michael McGuffin, et al., *Acquisition of Expanding Targets*, ACM Conference on Human Factors in Computing Systems (CHI), 2002, pp. 57-64. In his article, Mr. McGuffin proposes expanding the displayed size of a target as a function of the distance between the pointer and the target. FIGS. 1A and 1B are pictorial diagrams of displayed content 100 on a display system for illustrating the techniques described by Mr. McGuffin in expanding targets as the pointer approaches them.

With regard to FIG. 1A, the displayed content 100 includes various targets, including targets 102-106, all in their normal, i.e., unexpanded, displayed state. Additionally, a user is moving pointer 120 towards target C 102. However, because the distance between pointer 120 and any of the targets exceeds some predetermined threshold, the targets remain unexpanded.

FIG. 1B illustrates the same displayed content 100 as the pointer 120 crosses various threshold distances between it and the targets. For example, target E 106 is closest to the pointer 120, and accordingly is expanded to the largest expansion size for target acquisition. Target D 104 is also quite close and is expanded accordingly, though not to the same extent as target E 106. Similarly, target C is slightly expanded as the pointer 120 is within a particular threshold for its expansion.

As can be seen in FIG. 1B, as targets are temporarily expanded to facilitate their acquisition, the surrounding area is affected. As can be seen between FIGS. 1A and 1B, several surrounding targets, such as targets 108-116, have been forced to temporarily move from the actual, unexpanded location. This has the pernicious side-effect of making it somewhat more difficult to acquire targets when they are proximately located to each other. Thus, if the intent of the user in FIG. 1A was to acquire target C 102, then moving the pointer 120 within target E 106 and target D 104 made it more difficult as target C has been shifted to the left. In other words, as the pointer 120 crosses targets to reach the intended target, the intended target moves. Clearly, this manner of expanding targets does not always facilitate target acquisition.

In light of the above identified issues, what is needed is an improved system and method for facilitating target acquisition. The present invention addresses this and other issues found in the prior art.

SUMMARY OF THE INVENTION

In accordance with aspects of the present invention, a computer system for facilitating target acquisition on an attached display system is presented. The computer system comprises an input device and a display system. The display system displays targets, and is also adapted to display expanded targets. Upon detecting an event to expand targets displayed on the display system, the computer system generates expanded targets. The expanded targets are generated such that each expanded target does not impinge on or overlap the location of another target. The computer system then temporarily displays the expanded targets on the display system.

In accordance with additional aspects of the present invention, a method for facilitating target acquisition on a computer system is presented. The method comprises detecting an event on a computer system to display expanded targets on the display system. Expanded targets are generated for display on the display system such that each expanded target does not impinge on the location of another target. The expanded targets are then temporarily displayed on the display system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a pictorial diagram illustrating an exemplary display system including various targets expanded into various shapes, including non-convex shaped tiles.

DETAILED DESCRIPTION

Figure 1A:
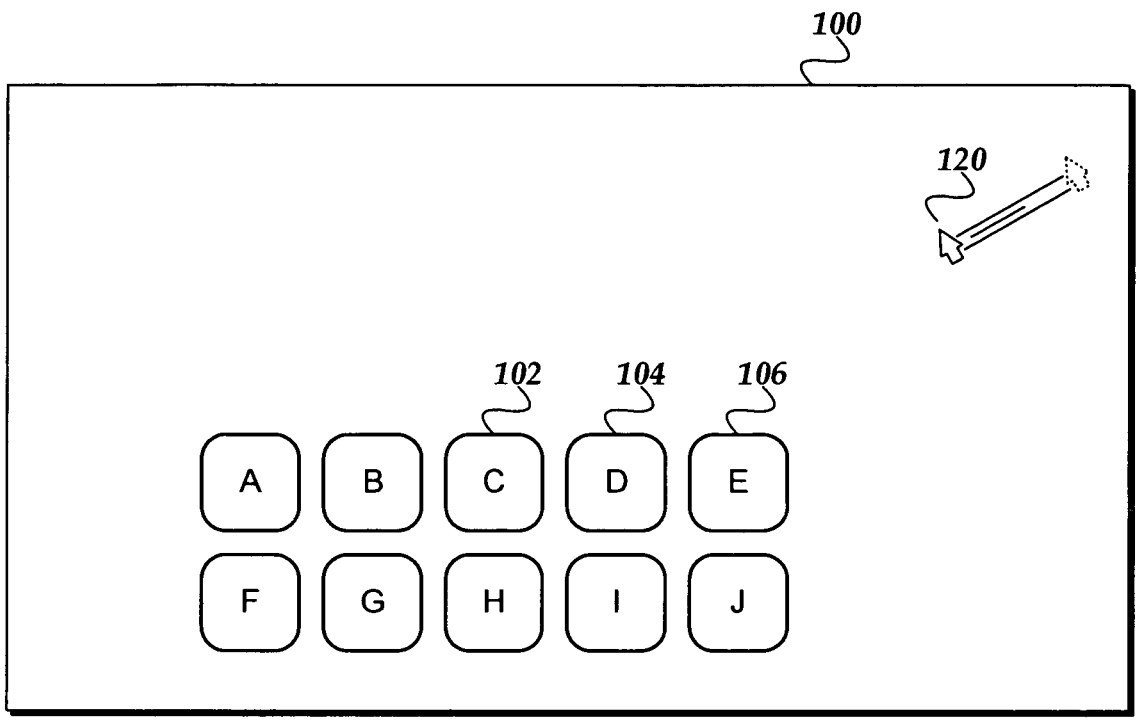
FIGS. 1A and 1B are pictorial diagrams illustrating display content, including various targets, and for illustrating at least one previous attempt to facilitate target acquisition by expanding the targets.
Figure 1B:
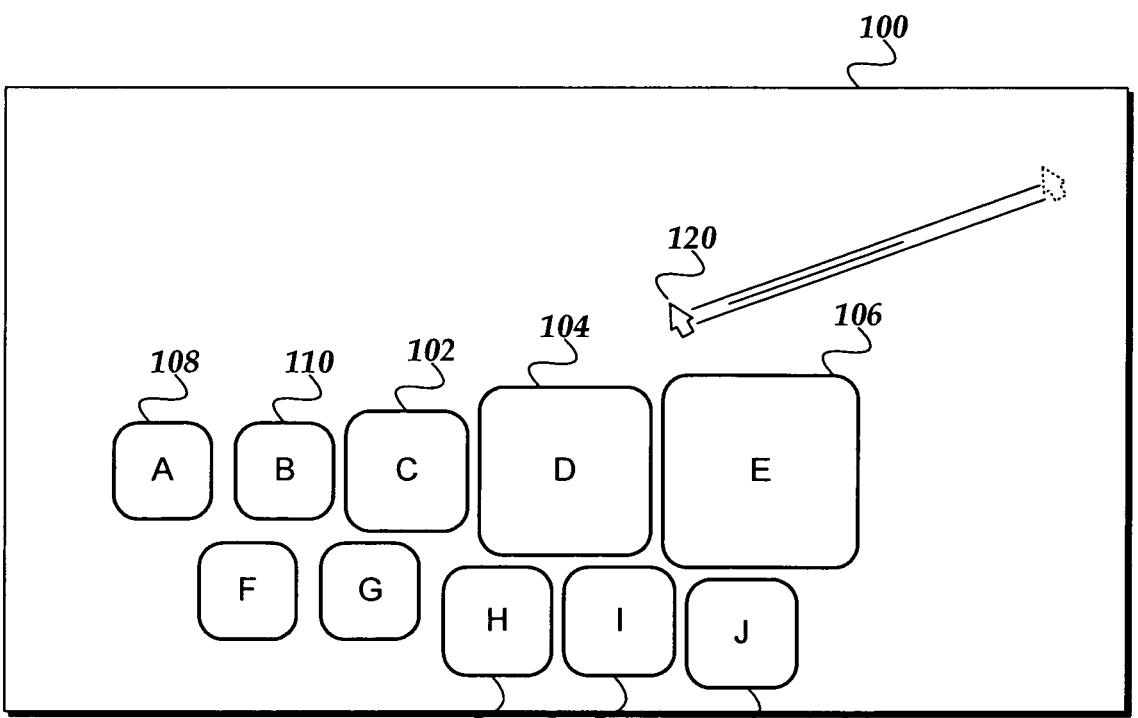

According to the present invention, to facilitate target acquisition, targets on the display system are expanded such that they take space that is not occupied by another target. In this manner, targets are neither obscured by expanding targets, nor are they "shoved aside", as shown in the example described in regard to FIGS. 1A and 1B. Expanding the targets is described in regard to FIGS. 2-5.

Figure 2:
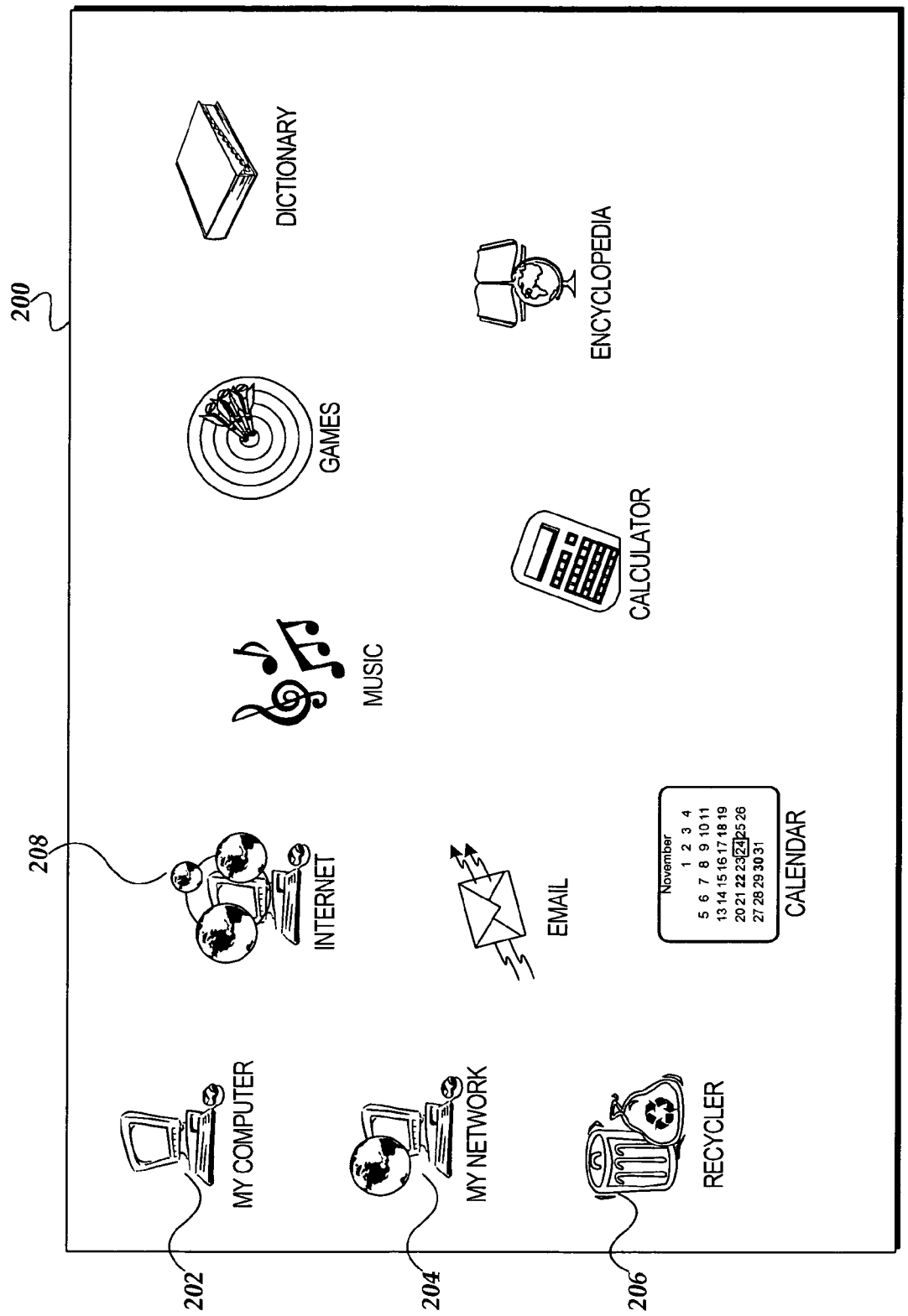
FIG. 2 is a pictorial diagram illustrating an exemplary display system displaying various targets, suitable for use by the present invention.
Figure 3:
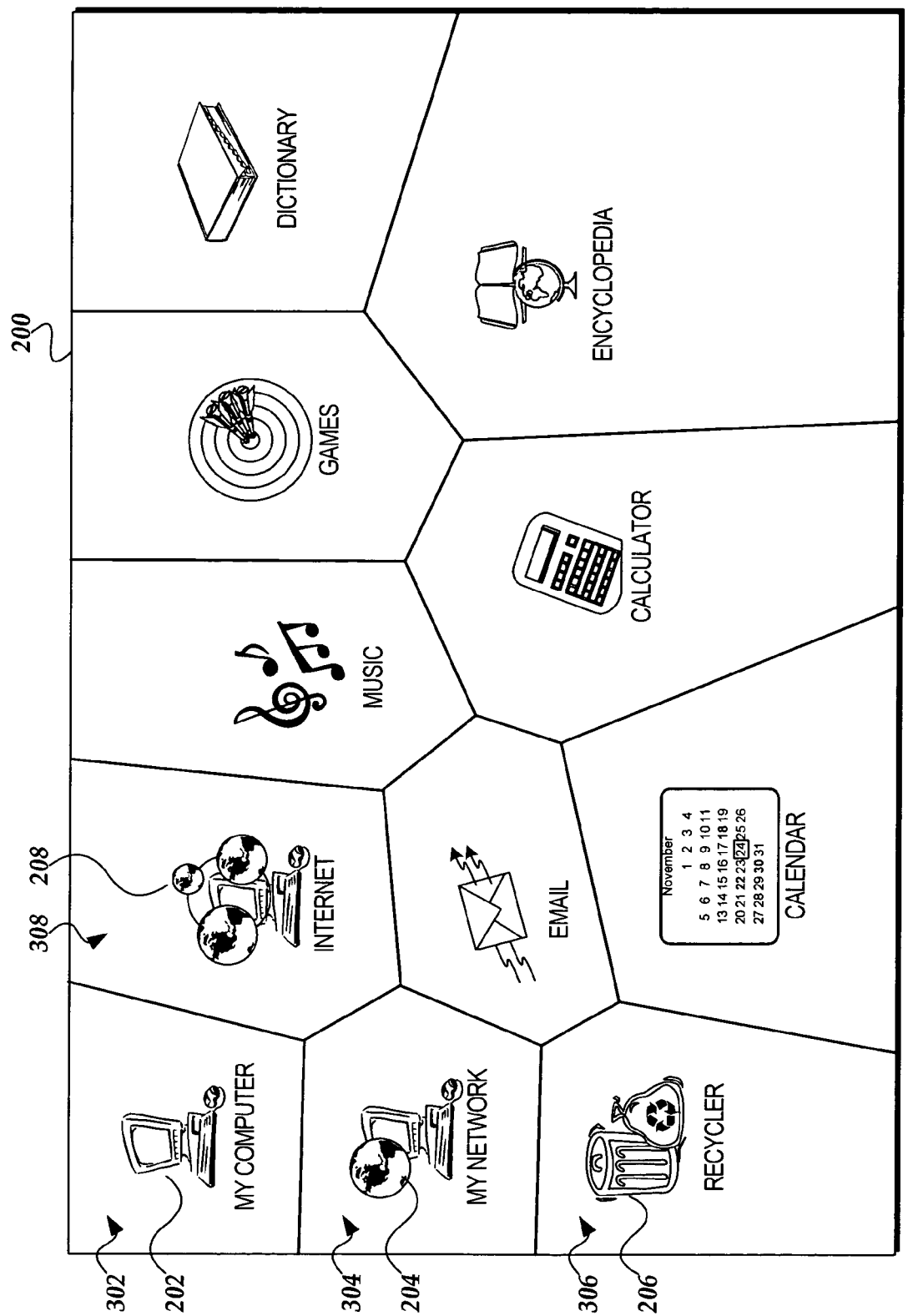
FIG. 3 is a pictorial diagram illustrating the exemplary display system of FIG. 1 with the various targets expanded according to a Voronoi-based diagram algorithm.

FIG. 2 is a pictorial diagram illustrating exemplary display system 200 including a computer monitor for displaying various targets, including targets 202-208. These targets, as shown in FIG. 2, represent unexpanded targets. In contrast, FIG. 3 is a pictorial diagram illustrating the exemplary display system 200 of FIG. 2 showing its various targets expanded according to aspects of the present invention in order to facilitate target acquisition. For example, as shown in FIG. 3, targets 202-208 have been expanded to correspond to tiles 302-308, respectively. Other targets displayed on the display system 200 are similarly expanded.

According to one embodiment, targets on a display system 200 are expanded into tiles shaped according to Voronoi polygons, i.e., where each polygon/tile contains only one target, and every point in a given polygon/tile is closer to the central point of the corresponding target than to any other target.

Figure 4:
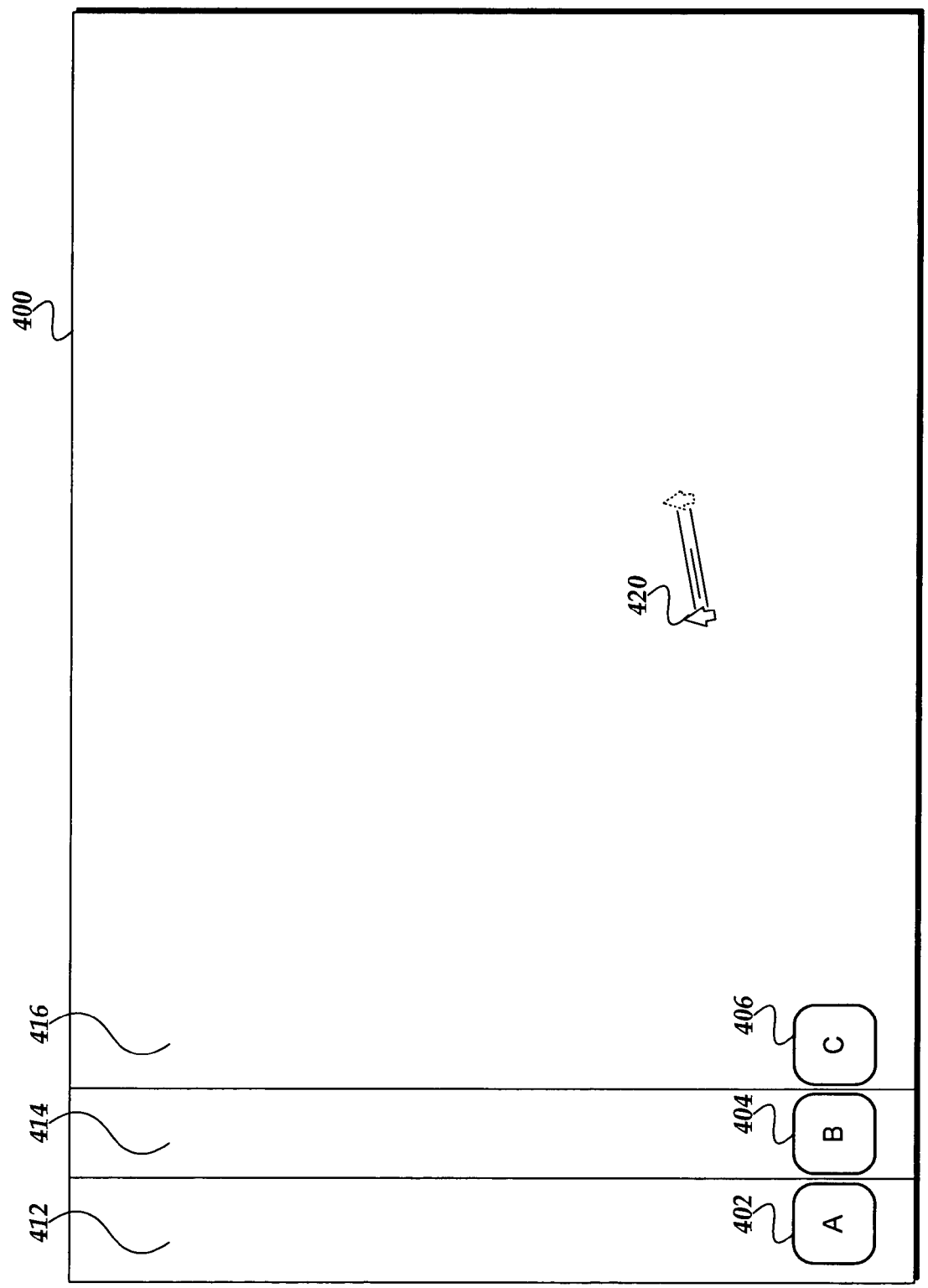
FIG. 4 is a pictorial diagram having a display system including three targets in close proximity to each other for illustrating aspects of expanding targets.

While expanding targets on the display system as tiles shaped as Voronoi polygons generally creates reasonable target expansion without impinging on other targets, there may be circumstances in which Voronoi polygons are not optimal. For example, when targets are arranged in close proximity to each other and/or display system borders, some targets tend to expand very little when formed as Voronoi polygons, and therefore, are not necessarily optimal for target acquisition. For example, FIG. 4 is a pictorial diagram illustrating a display system 400 displaying three targets in close proximity to each other, as well as to the display system's boundary. As can be seen, the expanded tile 416 for target 406 consumes almost the entire display surface, while tiles 412-414 corresponding to targets 402-404 are relegated to relatively narrow columns. When using the pointer 420 from its current position, target acquisition is only modestly enhanced, especially for targets 402-404, due to the narrow columns corresponding to those targets.

One purpose of the present invention is to expand the targets into available display space, i.e., not impinging upon other targets. As such, the present invention is not, and should not be construed as limited to expanding targets in the shape of Voronoi polygons. For example, FIGS. 5A and 5B are pictorial diagrams illustrating an exemplary display system 500 including various targets, such as targets 502-512, and further illustrating the corresponding expanded tiles, including expanded tiles 522-532, that have been expanded according to a distance plus area algorithm.

One purpose behind the distance plus area algorithm is to permit the expanded tile corresponding to one target to get closer to another target so that the former expanded tile can achieve a particular surface area. With regard to Voronoi polygons, the polygons are formed such that the tile boundary falls evenly between any two targets. With the distance plus area algorithm, a determination as to whether a pixel on the display surface belongs to one tile or another is made according to a weighted distance function based on the distance from a target (i.e., closest target wins the pixel), and weighted according to the area previously assigned to any one expanded tile. Accordingly, the distance plus area algorithm may include an iterative aspect, where no weighting is given to any tile on the first iteration. After the first iteration, a determination is made as to whether the surface areas of the expanded tiles are of sufficient size, and if not, those tiles that are undersized are assigned a higher weighting, and the expansion is repeated. Thus, when determining to which tile any one pixel should be assigned, the distances between any two targets factor in the assigned weighting, thereby favoring assigning some pixels to a tile that would not be assigned without the weighting. This, of course, adds additional display surface to undersized tiles. Of course, in accordance with aspects of the present invention, tiles should not grow such that they impinge upon other targets. This iterative process may be repeated until some optimal area distribution is achieved.

Figure 5A:
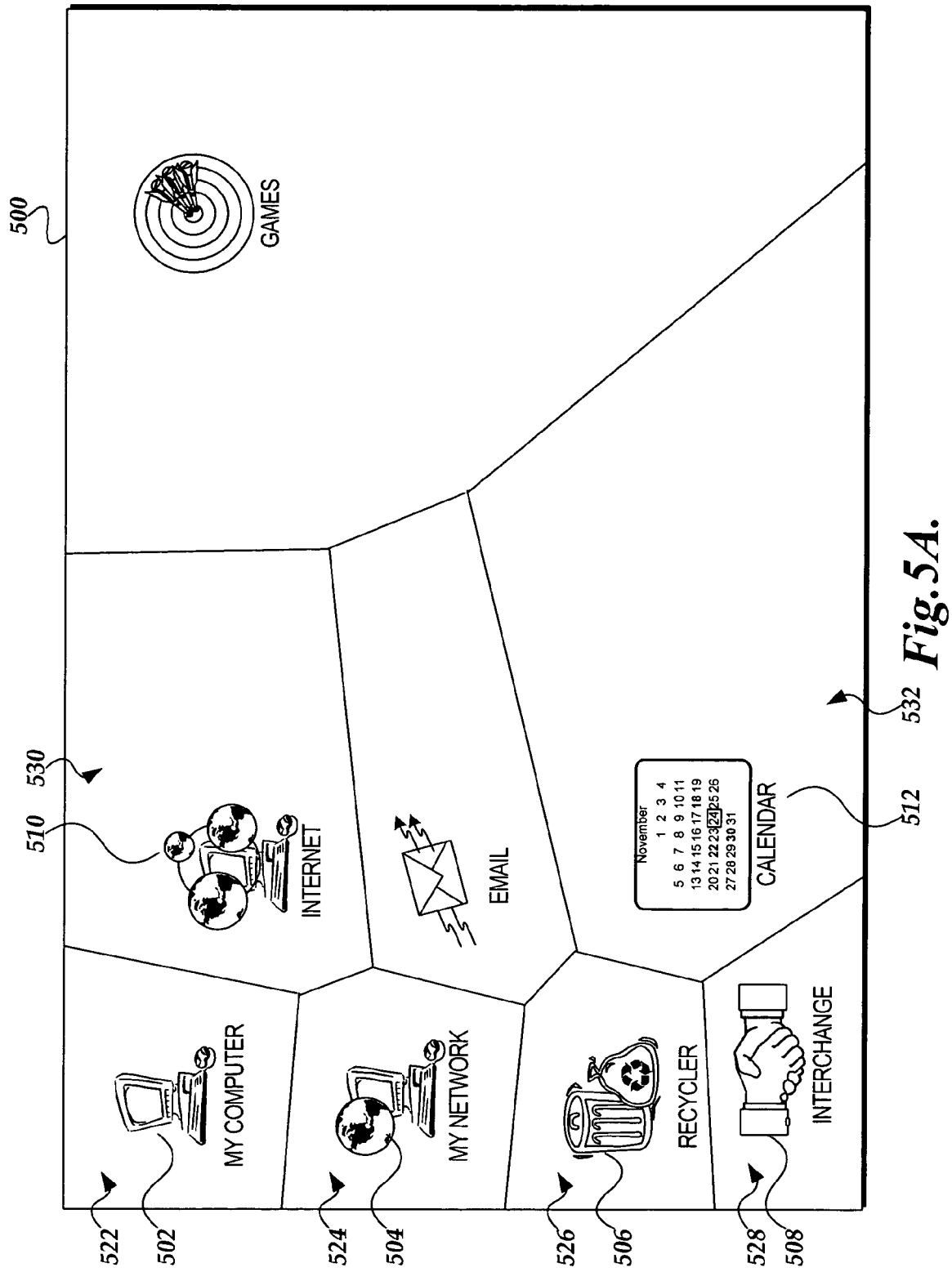
FIGS. 5A and 5B are pictorial diagrams illustrating the exemplary display system of FIG. 1 with the various targets expanded to illustrate an alternative distance plus area weighting algorithm.
Figure 5B:
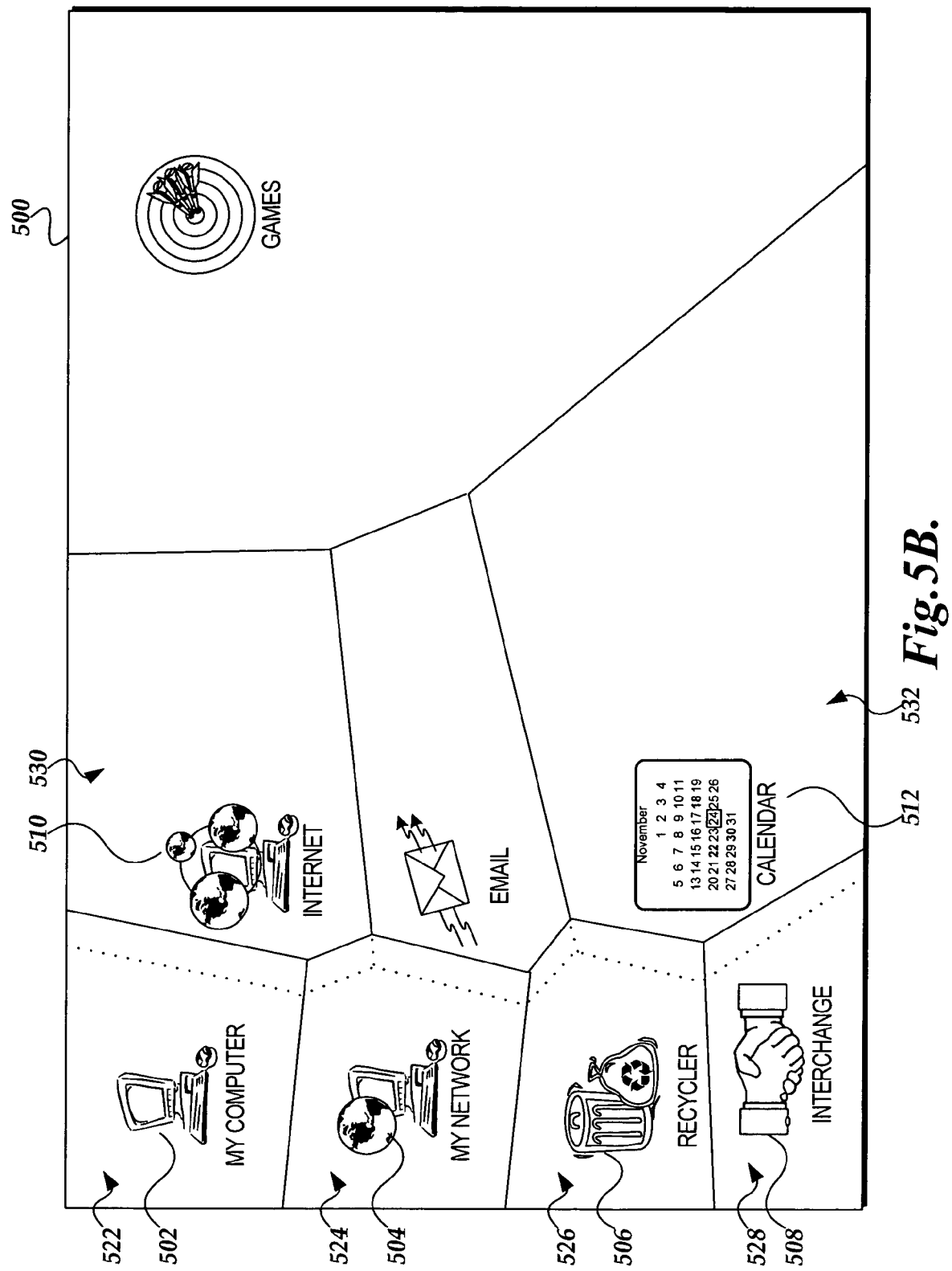

With regard to FIGS. 5A and 5B, these pictorial diagrams illustrate how a distance plus area algorithm can be configured to produce Voronoi polygons by setting the weights associated with each cell to the same value, but how changing weights causes tiles with higher weights to expand beyond their base Voronoi polygon boundaries. More particularly, FIG. 5A illustrates expanded tiles, including tiles 522, 524, 526, 528, 530, and 532, formed as typical Voronio polygons for displayed targets, including 502, 504, 506, 508, 510, and 512 respectively. However, with reference to FIG. 5B, after applying a distance plus area algorithm, the boundaries of several tiles, such as expanded tiles 522, 524, 526, and 528, approach, or encroach upon, other targets more closely than regular Voronoi polygons of equal weights would. For example, the boundaries for expanded tiles 522, 524, 526, and 528 have been extended beyond their Voronoi polygon bases of FIG. 5A, shown in FIG. 5B with the dotted lines, encroaching on, but not overlapping, neighboring targets. This gives the targets that are bounded by other tiles and/or display boundaries, such as target 508, more expansion area.

It should be appreciated, however, that in an actual embodiment, the expanded tiles illustrated in FIG. 5A would not typically be displayed. They are shown here for illustration purposes. Typically, only the expanded tiles as shown in FIG. 5B would be displayed when the system is utilizing a distance plus area algorithm.

The previous examples of expanded tiles, i.e., those of FIGS. 3-5, illustrate the expanded tiles as convex polygons, i.e., the centerpoint of each expanded tile resides within its borders. However, while the previous examples describe convex polygons and possible algorithms for generating these polygons, the present invention is not so limited. According to aspects of the present invention, any number of algorithms producing any number of expanded shapes may be used. For example, FIG. 6 is a pictorial diagram illustrating a display system 600 displaying targets 602-608, with expanded tiles being irregular in shape. It should be noted that tile 612 is very likely not a convex tile, while tiles 614-618 may be.

It should be further noted that the irregularly shaped expanded tiles of FIG. 6 may actually provide a more balanced area allocation for target acquisition, i.e., larger areas for targets that would otherwise expand to relatively small areas, as they would not be constrained by other targets. For example, target 602 is bounded by the display boundaries and targets 204-208. Under linear or distance based algorithms described above, even the distance plus area algorithm, the expanded tile for target 602 would be quite limited and relatively small. However, using an algorithm that could generate the irregular shapes shown in FIG. 6, expanded tile 612 is about the same in area as the other expanded tiles.

Those skilled in the art will appreciate that the expansion of targets may be performed prior to actual need or, alternatively, in an on-demand situation. For example, most targets, such as folders, applications, and devices with an iconic representation on the display area, are relatively static, meaning that they are not frequently rearranged on the display system. Thus, as an efficiency matter, the actual expansion of the targets may be performed once each time a target is moved, added, or deleted, and the resulting expansion information is saved for subsequent use, i.e., when it is necessary to display the expanded targets to the user. Alternatively, as mentioned above, the targets may be expanded and displayed in an on-demand manner.

In one embodiment, display of expanded targets/tiles occurs when a particular dynamic condition is detected, or alternatively, when selectively directed to be displayed by a user. For example, the expanded tiles may detect that a user begins to select and drag an item (dragging an item is one of the situations when expanded targets are especially beneficial), thereby triggering the display of the expanded targets. Alternatively, a user may direct that expanded targets be displayed, and remain displayed until directed to be hidden again. Those skilled in the art will appreciate that the display of the expanded tiles may be invoked and extinguished in any number of ways, and the present invention should not be construed as limited to any one way.

The above illustrated examples have shown that when expanding targets, all targets displayed on the display area of the display system are expanded. However, this is for illustration purposes, and should not be construed as limiting upon the present invention. According to alternative aspects of the present invention typically, but not always, associated with on-demand target expansion, only those targets who can respond to a particular action are expanded and/or displayed as expanded targets. For example, if a user selects and drags an item, such as a particular type of file, only those targets, such as folders or applications that operate with the particular type of file, are expanded and/or displayed as expanded targets.

The above-described figures have illustrated that the expanded tiles/targets are delineated by lines. However, this is merely for illustration purposes, and should not be construed as limiting upon the present invention. While boundary delineation with lines is one manner is which expanded tiles may be displayed, there are numerous other manners in which expanded targets may be illustrated to a user, including colored tiles or raising screen areas corresponding to the expanded target when a pointer, such as pointer 120 (FIG. 1) passes over a particular expanded tile.

If should be further noted that while in most of the above-described figures, all areas of the display system are assigned to an expanded target, in at least one embodiment, not all of the display area of a display system is assigned to an expanded target. For example, as shown in FIG. 6, in one embodiment, targets are expanded until they achieve a predetermined area, after which no more display area is assigned to the expanded target.

Figure 7:
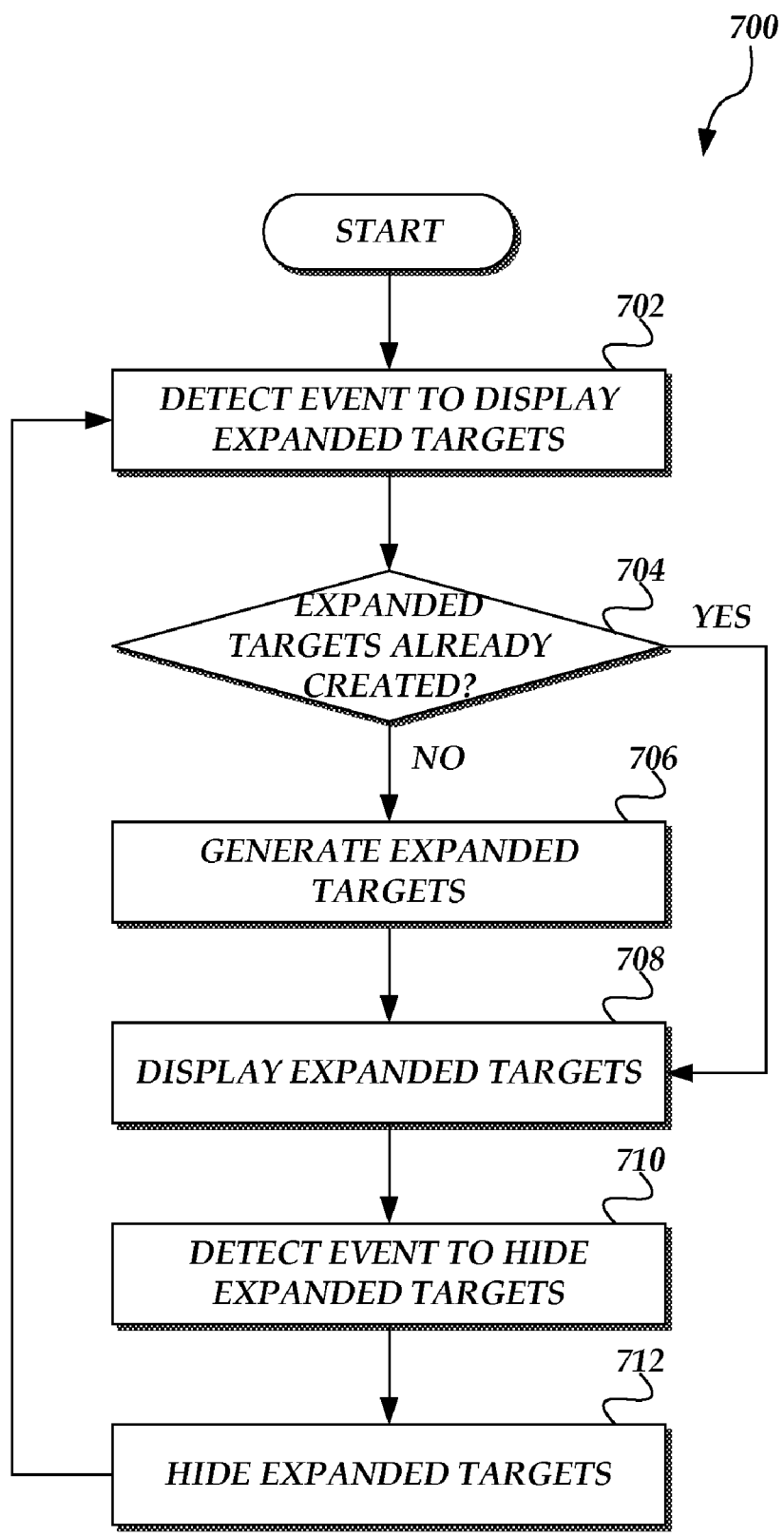
FIG. 7 is a block diagram illustrating an exemplary routine for displaying expanded targets on a display system.

FIG. 7 is a block diagram illustrating an exemplary routine for temporarily displaying expanded targets/tiles on a display system. Beginning at block 702, an event for displaying expanded targets on the display system is detected. As discussed above, the event may be a user selecting and dragging an object on the display system, or the user otherwise selectively activating the display of expanded targets. After detecting the event, at decision block 704, a determination is made as to whether expanded tiles have been generated for the targets to be expanded. If the expanded tiles have not been generated, at block 706, the routine 700 generates the expanded tiles.

After generating the expanded tiles, or if the expanded tiles have already been generated, at block 708, the expanded targets/tiles are displayed to the user. The expanded targets remain displayed to the user until, at block 710, an event for hiding the expanded targets/tiles is detected. At block 712, the expanded targets are hidden, and the routine 700 returns to block 702.

It should be noted that if, in one embodiment, the user modifies the targets by adding, moving, or deleting a target, or if the targets to be expanded are different that those previously cached, the stored expansion information will be destroyed such that the routine 700 will determine that it needs to generate the expanded tiles at decision block 704.

As an alternative (not shown), an incremental algorithm may be employed, such that only those expanded targets/tiles affected by a modification to the targets is recomputed. For example, while moving a target from one location on the screen to another will certainly impact targets proximate to the origin and destination location of the moved target, many other targets will remain unaffected. In this situation, the incremental algorithm could identify the impacted targets, and modify their expansion information accordingly. This incremental algorithm would also minimize the visual rearrangements of the targets. This assists the user's target acquisition in that the user can memorize, or rely upon, the location of unaffected targets, as well as reduce the amount of change that may otherwise occur, especially where non-Voronoi expansion techniques are used.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer system for facilitating target acquisition on a display system, the system comprising:
    an input device; and
    a display system including a monitor for displaying a plurality of targets and adapted to display expanded targets;
    wherein the computer system, upon detecting an event to expand targets displayed on the display system:
        generates a plurality of expanded targets for temporary display on the display system, such that each expanded target does not obscure or does not move another target;
        determines, among the plurality of expanded targets, and undersized target whose are is less than a predetermined threshold, and, when the undersized target is determined;
        increases a weighting associated with the undersized target; and
        adjusts the area of each of the expanded targets according to weight distances of pixels, wherein a weighted distance of each pixel is determined based on a weighting associated with an expanded target and a distance between the pixel and the expanded target; and
    temporarily displays the expanded targets on the display system.

2. The computer system of claim 1, wherein the computer system generates the expanded targets as Voronoi polygons.

3. The computer system of claim 1 wherein generating the expanded targets comprises determining whether a display pixel belongs to an expanded target according to weighted distances between at least two targets.

4. The computer system of claim 3, wherein after the computer system adjusts the area of each generated expanded target the computer system:
    determines whether there is another undersized target that has an area less than the predetermined threshold, and if so:
        increases a weighting associated with the another undersized target; and adjusts the area of each generated expanded target according to weight distances of pixels.

5. The computer system of claim 1, wherein the detected event is a selection and drag operation of an item displayed on the display system.

6. The computer system of claim 5, wherein the computer system expands only those targets that are responsive to the selected item on the display system.

7. The computer system of claim 1, wherein the expanded targets are non-convex shapes.

8. The computer system of claim 1, wherein the expanded targets occupy less than the entire display area of the display system.

9. The computer system of claim 1, wherein the expanded targets are delineated by displaying the expanded targets in varying colors.

10. The computer system of claim 1, wherein temporarily displaying the expanded targets on the display system comprises displaying an expanded target as a raised expanded target when a pointer is located within the expanded target's boundaries.

11. A method for facilitating target acquisition on a computer system, the method comprising:
   detecting an event on a computer system to display expanded targets on the display system;
   generating a plurality of expanded targets for display on the display system, such that each expanded target does not obscure or does not move another target;
   determining, among the plurality of expanded targets, and undersized target whose are is less than a predetermined threshold in size, and, when the undersized target is determined;
   increasing a weighting associated with the undersized target; and
   adjusting the area of each of the expanded targets according to weight distances of pixels, wherein a weighted distance of each pixel is determined based on a weighting associated with an expanded target and a distance between the pixel and the expanded target; and
   temporarily displaying the expanded targets on the display system.

12. The method of claim 11, wherein generating expanded targets for display on the display system comprises generating expanded targets as Voronoi polygons.

13. The method of claim 11, wherein generating the expanded targets comprises determining whether a display pixel belongs to an expanded target according to weighted distances between at least two targets.

14. The method of claim 13, wherein generating the plurality of expanded targets further comprises:
   determining whether there is another undersized target that has an area less than the predetermined threshold, and if so:
   increasing the weighting associated with the another expanded target; and
   adjusting the area of each generated expanded target according to weight distances of pixels.

15. The method of claim 11, wherein detecting an event on a computer system to display expanded targets on the display system comprises detecting a drag operation of an item displayed on the display system.

16. The method of claim 15, wherein the computer system expands only those targets that are responsive to the dragged item.

17. The method of claim 15, wherein generating expanded targets for display on the display system comprises generating expanded targets as Voronoi polygons.

18. The method of claim 11, wherein the expanded targets include non-convex shapes.

19. The method of claim 11, wherein the expanded targets occupy less than the entire display area of the display system.

20. The method of claim 11, wherein the expanded targets are delineated by displaying the expanded targets in varying colors.

21. The method of claim 11, wherein temporarily displaying the expanded targets on the display system comprises displaying an expanded target as a raised expanded target when a pointer is located within the expanded target's boundaries.

* * * * *